May 22, 1962   A. B. COHEN ET AL   3,035,915
PROCESS FOR RENDERING POLYESTER FILM RECEPTIVE TO
PHOTOGRAPHIC MATERIALS AND RESULTING ELEMENTS
Filed Dec. 29, 1958
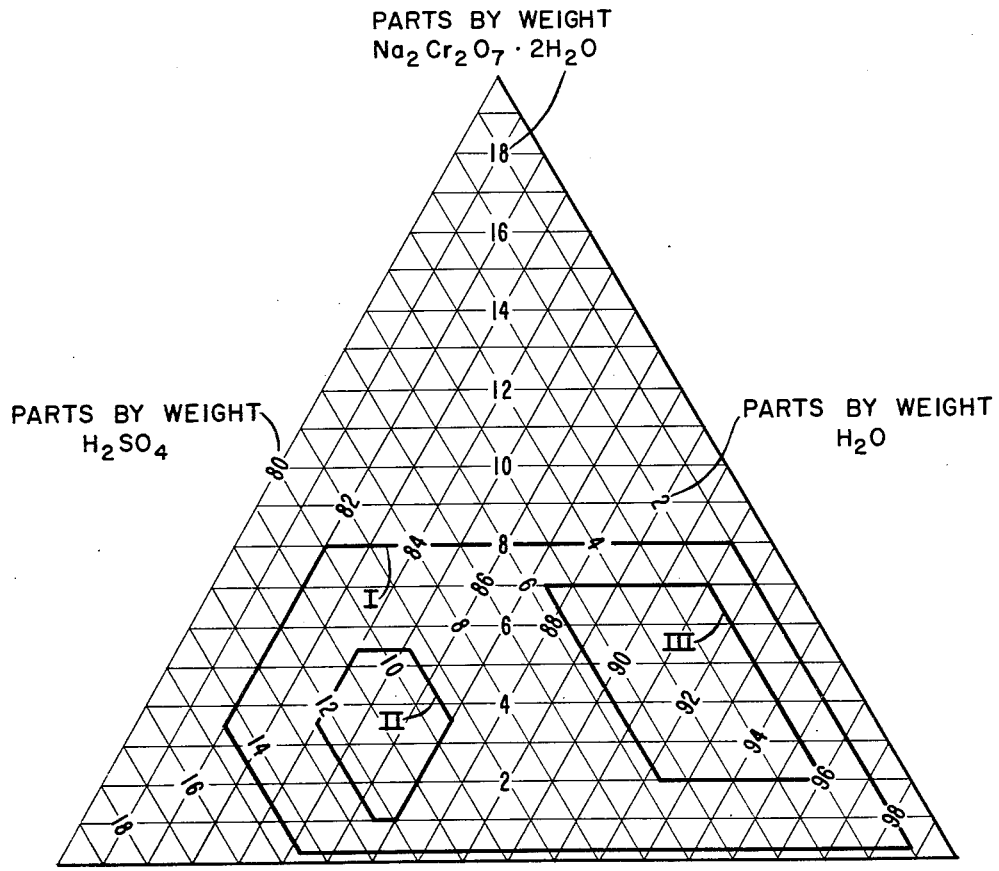
INVENTORS
ABRAHAM BERNARD COHEN
ROBERT BERNARD HEIART
BY *Lynn Barratt Morris*
ATTORNEY ＃ 3,035,915
PROCESS FOR RENDERING POLYESTER FILM RECEPTIVE TO PHOTOGRAPHIC MATERIALS AND RESULTING ELEMENTS
Abraham Bernard Cohen, Springfield, and Robert Bernard Heiart, Matawan, N.J., assignors to E. I. du Pont de Nemours and Company, Wilmington, Del., a corporation of Delaware
Filed Dec. 29, 1958, Ser. No. 783,313
16 Claims. (Cl. 96—87)

This invention relates to a process for imparting hydrophilic properties to the surfaces of hydrophobic highly polymeric polyester film corresponding to the polyester reaction product of (1) at least one alcohol of the formula $HOCH_2$—W—$CH_2OH$ where W is a polymethylene or an alkyl-substituted polymethylene chain of 0 to 8 carbons or a cycloalkylene radical of 5 to 6 carbons, and (2) one, two or more dibasic carboxylic acids of which at least 15 mole percent is terephthalic acid. More particularly it relates to such a process wherein the polyester contains at least 15 mole percent of terephthalic acid and the hydrophilic surfaces are obtained by contacting the surfaces of the film with a treatment solution comprised of concentrated sulfuric acid and chromic acid and subsequently washing the treated surface with water.

Recently, photographic film elements having a base composed mainly of a polyethylene terephthalate have become of commercial importance. These films have excellent clarity, strength and dimensional stability. Their hydrophobic character and insolubility in conventional solvents have made it difficult to coat the surface of the film with various layers and particularly with water-permeable colloid layers. In order to overcome this difficulty, thin layers of various organic polymers have been applied to the surface of the polyester films. The tricomponent vinylidene chloride/acrylic ester/itaconic acid copolymers, disclosed in U.S. patents, Swindells, 2,698,235, and Alles et al., 2,627,088, are particularly useful. The organic polymer layers proposed for this purpose are then coated with a water-permeable colloid layer and/or other layers. However, the application of such sublayers to poly(polymethylene) terephthalate film bases is time consuming and adds to the cost of making photographic film base and photographic film elements.

An object of this invention is to provide a new process for providing poly(polymethylene) terephthalate and related polymeric films with a hydrophilic surface. Another object is to provide such a process which does not require the use of expensive coating apparatus. Yet another object is to provide such a process which does not require coating sublayers of polymers of the non-water-permeable type on the polymeric films. A further object is to provide a process for providing the aforesaid films with uniform hydrophilic surfaces which are translucent or transparent. A still further object is to provide such a process wherein a hydrophilic surface is coated with a water-permeable colloid layer and/or an image-yielding layer. A still further object is to provide poly(polymethylene) terephthalate and related polymeric films having hydrophilic surfaces and a water-permeable colloid layer and/or a photo-sensitive image-yielding layer. Still further objects will be apparent from the following description of the invention.

It has been discovered that improved photographic film base and improved photosensitive image-yielding film elements can be prepared, in accordance with this invention, by treating the surface or surfaces of a polyester film comprising a polyester of (1) at least one glycol of the formula W—$(CH_2OH)_2$ where W is a polymethylene or alkyl-substituted polymethylene chain of 0 to 8 carbon atoms, or a cycloalkylene radical of 5 to 6 carbon atoms, and (2) one or more aliphatic or aromatic dicarboxylic acids wherein at least 15 mole percent is terephthalic, with a treatment solution comprised of 82.0 to 98.8 parts by weight of $H_2SO_4$, 1.0 to 14.5 parts by weight of water and an amount of chromic acid yielding compound equivalent to 0.1 to 4.0 parts by weight $Cr_2O_3$. Immediately after such treatment of the surfaces of the film, the film is contacted with an excess of water. The polyesters can contain up to 20 mole percent aliphatic dicarboxylic acids. Preferably, it is quenched in water, quiescent or non-turbulent, and maintained at a temperature of 10° C. to 15° C. whereby excess acid, salts and other soluble materials are removed from the hydrophilic surfaces of the film. The quenched film is then thoroughly washed with water and may then be dried. The resulting film can then be coated before or after drying with a desired material, e.g., a light-sensitive diazo or a bichromate solution in gelatin; a water-permeable organic colloid having protective colloid properties free from or containing light-sensitive photographic material or other ingredients. Thus, when an antihalation layer is desired, the aqueous colloid solution can contain colloidal silver or an antihalation pigment or dye. An aqueous gelatin silver halide emulsion can be coated directly on a hydrophilic surface of the acid-treated polyester film.

The surface or surfaces of the polyester film, e.g., polyethylene terephthalate film, are contacted with the treatment solution for a period sufficient to confer the desired hydrophilic properties. The length of time will, of course, vary with the particular polymeric film, the composition of the acid treatment solution, the temperature of said solution and the manner in which the polymeric film is brought into contact with the acid treatment solution. In general, where the film is contacted with, immersed in, or passed through the treatment solution, each square inch of the film should be in contact with said solution for about 0.1 second up to about 60 seconds and preferably from 1 to 15 seconds. The temperature of the treatment solution can range from 0 to about 60° C. or more, preferably 5 to 30° C.

By treating polyethylene terephthalate films with the following solution, hydrophilic surfaces will be formed:

(A) 82 to 98.8 parts by weight of $H_2SO_4$, 1 to 14.5 parts by weight of $H_2O$ and an amount of a chromic acid-yielding compound equivalent to 0.1 to 4.0 parts by weight of $Cr_2O_3$.

It has been further discovered that the optical nature of the hydrophilic surface of the acid-treated film can be varied from transparent to translucent by varying the components in the treatment solution. A preferred solution useful for preparing transparent hydrophilic surfaces on polyethylene terephthalate films is as follows:

(B) 84.0 to 87.0 parts by weight of $H_2SO_4$, 9.4 to 12.4 parts by weight $H_2O$ and an amount of a chromic acid yielding compound equivalent to 0.5 to 2.7 parts by weight of $Cr_2O_3$.

A preferred solution useful for preparing translucent hydrophilic surfaces on polyethylene terephthalate films is as follows:

(C) 87.4 to 96.0 parts by weight of $H_2SO_4$, 2.0 to 5.6 parts by weight of $H_2O$ and an amount of a chromic acid yielding compound equivalent to 1.0 to 3.6 parts by weight of $Cr_2O_3$.

In the attached drawing (a triangular co-ordinate graph) which constitutes a part of this application: Pentagonal area I encompasses the broad range of concentration for the three constituents of a preferred treatment bath. Hexagonal area II encompasses a range of concentration for the constituents which results in essentially transparent characteristics in the treated polyester film. Quadrangular area II encompasses a range of concentration for the constituents which results in translucent characteristics in the treated polyester film. The parts by weight for the three areas are as follows:

(I) 82.0 to 98.8 parts by weight of $H_2SO_4$, 1.0 to 14.5 parts by weight of $H_2O$ and 0.2 to 8.0 parts by weight of $Na_2Cr_2O_7 \cdot 2H_2O$.

(II) 84.0 to 87.0 parts by weight of $H_2SO_4$, 9.4 to 12.4 parts by weight of $H_2O$ and 1.0 to 5.5 parts by weight of $Na_2Cr_2O_7 \cdot 2H_2O$.

(III) 87.4 to 96.0 parts by weight of $H_2SO_4$, 2.0 to 5.6 parts by weight of $H_2O$ and 2.0 to 7.0 parts by weight of $Na_2Cr_2O_7 \cdot 2H_2O$.

After the acid treated films are washed they can be coated before or after drying with an aqueous solution or dispersion of a water-permeable organic colloid having protective colloid properties or with other layers of light-sensitive photographic films or plates. The water-permeable colloid solution or dispersion may be free from or may contain light-sensitive silver halide grains. It may contain filter dyes, opacifying agents or matting agents or other materials used in photographic films.

The hydrophilic surfaces of the treated films, moreover, can be coated with light-sensitive diazo compounds from aqueous or solvent solutions containing a binding agent, coated with photopolymerizable, image-yielding compositions of the type described in Plambeck U.S. Patents 2,760,863 and 2,791,504 or coated with light-sensitive bichromated gelatin solutions.

The invention will be further illustrated but is not intended to be limited by the following examples:

*Example I*

Fifty grams of $Na_2Cr_2O_7 \cdot 2H_2O$ was put into 500 ml. of $H_2SO_4$ (95 to 98% acid, S.G. 1.8407–1.8437 at 60° F.) and the resultant acid solution cooled to 5° C. Three separate 5-inch by 7-inch sheets of a 4-mil thick uncoated polyethylene terephthalate photographic film base having a melting point of about 250° C. and cast, stretched, heat-set and heat-relaxed as described in Alles, U.S. 2,779,684, were immersed for 1, 5 and 15 seconds respectively in the cold acid solution. Immediately after the acid treatment, the films were transferred to a quiescent water bath (15° C.) where the excess acid, salts, and other water soluble materials were removed from the surface. The films were then washed for at least 5 minutes with cold tap water and air dried at room temperature. The resultant film sheets had a uniform surface which was non-tacky, yellow colored, translucent and hydrophilic. Upon application of water to the treated film, a thin uniform layer of water was formed on the surface. When water is applied in like manner to a non-acid treated, uncoated oriented polyethylene terephthalate film the water forms droplets on the surface of the film rather than a uniform film.

*Example II*

An acid reagent consisting of 30 grams of $Na_2Cr_2O_7 \cdot 2H_2O$, 36 ml. water, and 300 ml. concentrated $H_2SO_4$ described in Example I was prepared. Three sheets of an oriented polyethylene terephthalate photographic film base as described in Example I were treated with the acid reagent at room temperature (approximately 23° C.) for 1, 5, and 15 seconds respectively. Immediately after their respective treatments the films were transferred to a cold quiescent water bath for about 10 seconds, removed to a second bath of running cold water, washed for 5 minutes, and air dried as described in Example I. Non-tacky, hydrophilic, transparent film sheets with a slight yellow color on the hydrophilic surface resulted. The film sheets were tested with water as described in Example I with comparable results being obtained.

*Example III*

Four sheets of transparent acid treated film base prepared as described in Example II were dip-coated with a gelatino-silver iodobromide photographic emulsion. The coated sheets were chilled in cold air until the emulsion set and were then dried at room temperature. The anchorage of the emulsion coating to the treated base was measured by making several intersecting cuts through the emulsion layer into the treated film base of one of the treated coated film sheets, placing a pressure-sensitive adhesive tape having a regenerated cellulose film base over the cuts, and sharply pulling the adhesive tape back. Upon inspection, no separation of the emulsion from the treated film base was observed. The anchorage of the emulsion coating to the treated base was measured during all conventional processing operations including developing, fixing and washing. Three film sheets were removed respectively from the developer, fixer and washing bath and several intersecting cuts were made through the wet emulsion layer into the treated film bases. While the film sheets were still wet attempts were made to slide the emulsion layer from the treated bases. Excellent adhesion was obtained during all phases of processing with the emulsion layer remaining intact.

*Example IV*

A saturated solution was prepared by adding 10 grams of $K_2CrO_4$ to 100 ml. of concentrated $H_2SO_4$ and stirring rapidly for 15 minutes. Excess solid was filtered off through a coarse sintered acid-resistant glass ("Pyrex") filter. The saturated solution was then cooled to 5° C. for use. Four separate sheets of uncoated polyethylene terephthalate photographic film base of the kind described in Example I, stretched, heat-set, and heat-relaxed as described in Alles, U.S. 2,779,684, were immersed for 1, 5, 15 and 60 seconds respectively in the cold saturated acid solution. The sheets immediately after their respective immersion periods were quenched in a quiescent bath of cold water (15° C.) as described in Example I and subsequently washed for 10 minutes in running cold water. The films were then air dried at room temperature. The films had hydrophilic, translucent surfaces which were yellow in color.

*Example V*

Example IV was repeated, except that the treatment solution consisted of 50 ml. of the $K_2CrO_4$-concentrated $H_2SO_4$ solution described in Example IV to which 5 ml. of water had been added. The resultant film sheets had transparent (yellow colored) hydrophilic surfaces.

*Example VI*

Example IV was repeated except that the treatment solution consisted of a saturated solution prepared by adding 10 grams of $CrO_3$ to 100 ml. of concentrated $H_2SO_4$ stirring, filtering and cooling as described in Example IV. The resultant film sheets had translucent (yellow colored) hydrophilic surfaces.

*Example VII*

Example IV was again repeated except that the treatment solution consisted of 50 ml. of $CrO_3$-concentrated $H_2SO_4$ solution described in Example VI to which 5 ml. of water had been added. The surfaces of the resultant film sheets were yellow in color but had transparent hydrophilic surfaces.

*Example VIII*

One sheet each of translucent and treated transparent biaxially oriented polyethylene terephthalate photographic film base, prepared as described in Examples I and II respectively, were coated with an anti-static layer consisting of beta-methacrylyloxyethylmethyldiethylammonium methylsulfate (80%)/vinylidene chloride (3%)/glycidyl methacrylate (17%) prepared as described in Example 1B of Upson et al., U.S. Patent 2,831,781, issued April 22, 1958. The anti-static dispersion uniformly wetted the hydrophilic surfaces. The logarithm of the resistances in ohms/square were determined at 70° F. for the two coated film sheets described above, one sheet of untreated, uncoated polyethylene terephthalate photographic film base, and one sheet of polyethylene terephthalate photographic film base coated with the sub-layer described in Example 11 of Swindells U.S. 2,698,235 and overcoated with the anti-static coating described above. The results are indicated in the table below.

After the resistance measurements were taken, the samples were washed for 1½ hours in cold running tap water and dried in air. The logarithm of the resistances, measured at 70° F., are as follows:

| Polyethylene terephthalate—Sample | Anti-static Coating | Before Washing Log R | | After Washing Log R, 40% RH |
|---|---|---|---|---|
| | | 40% RH | 70% RH | |
| Treated, translucent | Yes | 13.4 | 10.7 | 13.7 |
| Treated, transparent | Yes | 12.2 | 10.0 | 13.8 |
| Untreated, no coatings | No | >15 | >15 | >15 |
| Untreated, resin sub coated | Yes | 13.6 | 10.9 | 13.7 |

It is evident from this table that the anti-static coating on treated polyester base is effective in increasing the electrical conductivity of the treated base. Furthermore, it is evident that the coating adheres to the treated polyester base and is not removed by an extended water wash.

Example IX

Three sheets of biaxially oriented polyethylene terephthalate photographic film base (4-mil) were treated as described in Example II. The dry treated films were then coated with a red sensitized gelatin (350 g.) silver iodobromide (282 g.) photographic emulsion which contained a cyan color forming polyvinyl acetal (406 g.) (Example III, U.S. Patent 2,489,655). Smooth coatings were obtained without the use of wetting agents.

Four of the coated sheets were soaked for 5 minutes at 20° C. in a solution of 44 g. of sodium carbonate monohydrate, 75 g. anhydrous sodium sulfite and distilled water to make 1500 ml. The sheets were then transferred to an agitated distilled water bath at 20° C. The temperature of the bath was raised approximately 1.5° C. per minute and the behavior of the emulsions observed. The emulsion layer on the treated films was still intact at 99.5° C. after a total immersion time of 52 minutes. The anchorage of another of the color reversal strips was tested dry and excellent anchorage was obtained. The remaining treated film sheet was exposed and developed in the conventional manner. No sign of increased fog or desensitization resulting from the chromic acid treated base was observed.

Example X

A treatment reagent solution was prepared consisting of 16 g. of $Na_2Cr_2O_7.2H_2O$, 24 ml. of $H_2O$ and 200 ml. of concentrated $H_2SO_4$ and the resultant solution cooled at 5° C. A sheet of uncoated polyethylene terephthalate photographic film base of the type described in Example I was immersed for 15 seconds in the cold acid bath. The film sheet was immediately immersed in a cold non-turbulent water quench bath (15° C.) until the excess dichromate-acid had been removed from the surfaces of the film. The sheet was washed in running cold water for 10 minutes and then hung to dry in the air. The treated film was transparent and had a non-tacky, hydrophilic surface.

A second film sheet was immersed for 15 seconds in a treatment reagent solution consisting of 16 g. of $Na_2Cr_2O_7.2H_2O$ in 213 ml. of concentrated $H_2SO_4$ cooled to 5° C. The quenching, washing and drying operations were identical to those given above in this example. The treated film was translucent and had a non-tacky hydrophilic surface.

The treated dried film sheets were placed in a horizontal position. A solution of 3% polyvinyl alcohol in water was then poured onto the horizontal sheets and allowed to dry. The dry-anchorage of the coating to the treated film base was tested by the procedure described in Example III. The adhesion test results were good for both the transparent and translucent films.

Example XI 5 g. $Na_2Cr_2O_7.2H_2O$ was put into 50 ml. of concentrated $H_2SO_4$ and the resultant solution cooled to 5° C. Three separate strips of an uncoated unoriented copolyester film base prepared from dimethyl terephthalate and dimethyl isophthalate as described in Example 1 of British patent specification No. 766,290 were immersed for 1, 5 and 15 seconds respectively in the cold solution described above. The films were immediately transferred to a cold, still water bath (15° C.) where the excess acid, salts and other water soluble materials present were removed from the surface. The treated films were washed for 5 minutes in running tap water and air dried. The resultant films were uniformly treated, non-tacky, yellow colored, transparent and hydrophilic.

Example XII

Three sheets of uncoated, oriented polyethylene terephthalate photographic film base were treated for 15 seconds with the chromic acid solution described in Example I. The treated sheets of film base were laid flat and overcoated by pouring onto the sheets a solution consisting of 5 g. of photopolymerizable granules, prepared as described in Example III of assignee's Burg U.S. application, Ser. No. 750,868, filed July 25, 1958, and 100 ml. of acetone. Upon drying a thin layer of photopolymerizable material, 0.3-mil thick, remained on the film sheets. The coated sheets were then exposed through a transparency containing half-tone and lines to an 1800-watt high-pressure mercury-arc lamp to 7-watt-seconds/square inch of actinic radiation. The sheets were sprayed with an 0.04-molar solution of sodium hydroxide for 75 seconds, followed by a water-spray wash and dried. A relief image of approximately 0.3-mil height having excellent anchorage of the image to the film base was obtained.

Example XIII

Three 5 inch x 7 inch sheets of uncoated, oriented polyethylene terephthalate photographic film base described in Example I were treated with the chromic acid treatment solution described in that example. The treated sheets were then coated with a predominantly aqueous dispersion of a water-soluble urea-formaldehyde resin containing finely divided silica and cured by reducing the pH to about 2 to 3 and heating as described in assignee's Van Stappen U.S. application Serial No. 774,822, filed Nov. 19, 1958, now U.S. Patent 2,964,423, issued December 13, 1960.

Example XIV

Polyethylene terephthalate photographic film base described in Example I was treated continuously. By means of electrically driven pull rolls, one surface of the film base was brought into contact for 5 seconds with a treatment solution consisting of 32 grams of $Na_2Cr_2O_7.2H_2O$ and 416 ml. of concentrated $H_2SO_4$ described in Example I. The treated film was immediately conducted by means of rollers to a non-turbulent, cold water bath where it was washed for 35 seconds. After the 35-second wash, the excess water was blown off and the base was hung to dry. The final film had a frosted, yellowish hydrophilic surface. The treated base was subsequently coated in the dark with a gelatino-silver iodobromide photographic emulsion, containing about 2% iodide and about 98% bromide. The coated film was given a graded exposure and developed, fixed and washed in the absence of light. Sensitometric testing of the film showed that satisfactory photographic properties were obtained. Fog, measured above the translucent background, was normal. Anchorage, dry and during processing, was excellent.

Example XV

Three sheets of oriented polyethylene terephthalate photographic film base as described in Example I were treated as described in Example II. After treatment the sheets were immediately transferred to a cold quiescent water bath for about 10 seconds and further immersed in water containing 1% gelatin and then dried. The treated sheets were transparent but slightly yellow in color and had hydrophilic surfaces which were coated with a thin layer of gelatin. The anchorage of the gelatin to the treated base was tested by the procedure described in Example III and was satisfactory.

Example XVI

A copolyester was prepared from 100 g. of bis(2-hydroxyethyl)terephthalate, 22.6 g. of bis(2-hydroxyethyl)-sebacate, by the procedure described in Whinfield et al., U.S. Patent 2,465,319. The copolyester was pressed at 275° C. into discs 40 mils in thickness and immediately quenched in water. The discs were then stretched biaxially at 50° C. to give a transparent, oriented film, 4 mils in thickness. A 2 by 6 inch piece of the stretched copolyester was immersed for 5 seconds at room temperature in a treatment solution consisting of 3.16 g. of $Na_2Cr_2O_7 \cdot 2H_2O$, 5.9 g. of $H_2O$ and 70.0 g. of concentrated $H_2SO_4$ described in Example I. The film was removed from the treatment solution and quenched in a bath of cold tap water (17° C.) for 10 seconds. The film was then washed in running water for 30 seconds. The resultant film had a uniform surface which was yellow in color, translucent and hydrophilic.

Example XVII

Example XVI was repeated except that the copolyester was prepared from 150.0 g. of bis(2-hydroxyethyl)terephthalate, 18.7 g. of bis(2-hydroxyethyl)sebacate. The resulting film had a uniform surface which was yellow in color, translucent and hydrophilic.

Sodium dichromate is preferred for preparing the treatment reagent because of its solubility characteristics. Since chromic acid ($H_2CrO_4$) is the active chemical species in the treatment reagent, it will be understood that effects similar to those achieved by the sodium dichromate/$H_2SO_4$/$H_2O$ system can be achieved by using amounts of other chromic acid-yielding chromium compounds, e.g., $CrO_3$, chromate or dichromate salts (which will give chromic acid in the presence of $H_2SO_4$ and water) to give within solubility limitations an equivalent amount of chromic acid in the treatment reagent.

The composition of the sodium dichromate/$H_2SO_4$/water treatment reagent can vary, as described above, according to the results desired. In some reagent compositions, however, particularly at high sodium dichromate and low water concentrations, upon standing for varying periods of time, a brownish-red solid precipitates, thereby reducing the effective concentration of the treatment reagent solution. It is, therefore, preferred that the treatment reagent be used before the brownish-red solid precipitates. The solution may be used after precipitation but treatment results will differ. Precipitations may also be avoided by continuously mixing an aqueous solution of the dichromate with sulfuric acid by means of a proportioning pump, thereby forming and delivering the reagent to the treatment station at the rate at which it is being consumed.

The invention is, of course, not limited to the treatment of the surfaces of the particular polyesters of the foregoing examples. Similar results can be obtained by treating films composed of any of the high-melting, difficultly soluble, usually microcrystalline, cold-drawing linear, highly polymerized esters of terephthalic acid and glycols of the series $HO(CH_2)_nOH$, where $n$ is an integer within the range of 2 to 10, described in Whinfield et al. Patent 2,465,319. Other useful polyester films which can be treated include those prepared from highly polymerized esters of terephthalic acid and at least one glycol of the formula $HOCH_2$—W—$CH_2OH$ where W is polymethylene or alkyl-substituted polymethylene of 0 to 8 carbons, e.g., 2,2-dimethylpropylene-1,3 or a cycloalkylene radical of 5 to 6 carbon atoms, e.g., cyclopentyl-1,3 and cyclohexyl-1,4. In addition, copolyester films prepared comprising up to 85 mole percent isophthalic acid and 15% or more of terephthalic acid components such as are disclosed in British patent specification 766,290 can be used. Films comprising up to 20 mole percent of aliphatic dicarboxylic acids based on total moles of acid, e.g., succinic, glutaric, adipic, hexahydroterephthalic and sebacic acids, in addition to at least 15 mole percent terephthalic acid are also useful. However, when aliphatic dicarboxylic acid components are in the polyethylene terephthalate polyester or copolyesters described above, due to the increased sensitivity of the aromatic-aliphatic dicarboxylic acid copolyester in the $H_2SO_4$—$H_2O$ solvent system, a greater amount of water is necessary in order to obtain a transparent form of the treated aromatic-aliphatic copolyester film. The aromatic-aliphatic copolyester films, have hydrophilic surfaces when treated by reagent solutions in the broad concentration range. The above-described polymers may contain a number (e.g., 1 to 12 or more) of ether groups in the polymer chain. Such ether groups may be added as part of ether containing glycol derivatives or formed by side reactions during polymerization.

The acid treated film should be quenched immediately because the effect of the strong acid will continue until the reagent is either consumed or diluted and removed, e.g., washed off the film surface. Water that is preferably quiescent or non-turbulent is used as the quenching bath so that the swollen surface of the film will not be distorted by currents of water. It is not necessary that the film be quenched in a bath because a fine spray or other washing means which will not affect the treated film surface can also be used. While it is preferred that cold water, e.g., 10 to 15° C. be used, warmer water, e.g., at room temperature (25° C.) or higher can be used. The quench bath may contain other substances in addition to water, e.g., gelatin or polyvinyl alcohol. The baths thus can serve the dual purpose that the separate washing and coating operations serve. It is preferred, however, that the treated film be coated directly with the photographic emulsions, etc.

The polyester film base having hydrophilic surfaces obtained in accordance with the processes of this invention, are useful for purposes other than making photographic film. The hydrophilic surfaces have improved wettability and excellent receptivity in printing inks. They are also useful for making films which have a translucent background.

The novel photographic film bases of the invention are especially useful in making photographic films of all types including those of the X-ray, graphic arts and motion picture type, both black and white and color. In fact any of the radiation sensitive materials and the water-permeable colloids described in the U.S. Patent 2,779,684 particularly in columns 6 and 7 can be applied to the hydrophilic surfaces of the acid-treated polyester film bases of this invention.

The fact that one can produce a good hydrophilic surface on a polyethylene terephthalate film base is quite surprising since it is known that concentrated sulfuric acid dissolves and deorients such polymers. In view of this fact one would expect the presence of such a strong oxidizing agent as chromic acid in sulfuric acid to have a somewhat deleterious effect rather than to confer excellent hydrophilic properties to the surface of films made from oriented polyesters of the foregoing type.

The invention enables one to obtain either a translucent or a transparent polyester film with a hydrophilic surface by simply varying the constitution of the acid treating solution. Both forms have properties superior to those of untreated poly(polymethylene) terephthalate films.

An advantage of the invention is that it provides new and improved poly(polymethylene) terephthalate and related polymeric film bases. Another advantage is that it provides new photographic film elements. Yet another advantage is that it provides a simple, quick, dependable and economical process for producing non-tacky uniform hydrophilic surfaces to poly(polymethylene) terephthalate and related polymeric film bases.

A further advantage of the invention is that it eliminates the need for subcoating polyester film bases of the foregoing type in order to improve adherence of layers of light sensitive silver halide emulsion water-permeable organic colloids having protective colloid properties.

Additional advantages are that the chromic acid/sulfuric acid solutions affect only the surface of the poly(polymethylene) terephthalate film base so that no cracking or delamination can occur as with laminated or supports coated with sublayers, e.g., cellulose ester film bases with resin coatings and polyethylene terephthalate films coated with a resin or copolymer sublayer.

What is claimed is:

1. A process for imparting hydrophilic properties to the surface of a hydrophobic film essentially composed of a highly polymeric polyester of (1) at least one dihydric alcohol of the formula $HOCH_2-W-CH_2OH$ wherein W is a divalent hydrocarbon radical selected from the group consisting of methylene, polymethylene and alkyl-substituted polymethylene of 0 to 8 carbons and cycloalkylene of 5–6 carbons and (2) at least one dicarboxylic acid, at least 15 mole percent of said acid being terephthalic acid, up to 20 mole percent being an aliphatic dicarboxylic acid and the remaining dicarboxylic acid being selected from the group consisting of terephthalic acid and isophthalic acid, which comprises contacting at least one surface of said film for a period up to about 60 seconds with a treatment solution comprising 82–98.8 parts by weight of $H_2SO_4$, 1–14.5 parts by weight of water and an amount of chromic acid yielding compound equivalent to 0.1 to 4.0 parts by weight $Cr_2O_3$ selected from the group consisting of chromium trioxide, chromic acid salts and dichromic acid salts, said compound yielding chromic acid in water containing sulfuric acid, until a hydrophilic surface is formed on the polyester film and contacting the treated surface of the film with an excess of water.

2. A process as defined in claim 1 wherein the film is contacted with the treatment solution for 0.1 to 60 seconds and then washed with water.

3. A process as defined in claim 1 wherein the treated surface of the film while wet was treated with an aqueous solution containing a water-permeable organic colloid having protective colloid properties.

4. A process as defined in claim 1 wherein $$Na_2Cr_2O_7 \cdot 2H_2O$$

is used as the chromic acid-yielding compound.

5. A process as defined in claim 1 wherein 84.0 to 87.0 parts by weight $H_2SO_4$, 9.4–12.4 parts by weight water and chromic acid-yielding compound equivalent to 0.5–2.7 parts by weight of $Cr_2O_3$ are used whereby a transparent polyester film having a hydrophilic surface is obtained.

6. A process as defined in claim 1 wherein 87.4 to 96.0 parts by weight of $H_2SO_4$, 2.0 to 5.6 parts by weight of $H_2O$ and chromic acid-yielding compound equivalent to 1.0–3.6 parts by weight $Cr_2O_3$ are used whereby a translucent polyester film having a hydrophilic surface is obtained.

7. A process as defined in claim 1 wherein 84.0–87.0 parts by weight $H_2SO_4$, 9.4–12.4 parts by weight water and 1.0 to 5.5 parts by weight of $Na_2Cr_2O_7 \cdot 2H_2O$ are used, whereby a transparent polyester film having a hydrophilic surface is obtained.

8. A process as defined in claim 1 wherein 87.4–96.0 parts by weight $H_2SO_4$, 2.0–5.6 parts by weight water and 2.0 to 7.0 parts by weight of $Na_2Cr_2O_7 \cdot 2H_2O$ are used, whereby a translucent polyester film having hydrophilic surface is obtained.

9. A process as defined in claim 1 wherein said polyester film is biaxially oriented.

10. A process as defined in claim 1 wherein said polyester is a polyethylene terephthalate having a melting point of at least 250° C.

11. A photographic film base comprising a biaxially oriented film essentially composed of a highly polymeric polyester of (1) at least one dihydric alcohol of the formula $HOCH_2-W-CH_2OH$ wherein W is a divalent hydrocarbon radical selected from the group consisting of methylene, polymethylene and alkyl-substituted polymethylene of 0 to 8 carbons and cycloalkylene of 5–6 carbons and (2) at least one dicarboxylic acid, at least 15 mole percent of said acid being terephthalic acid, up to 20 mole percent being an aliphatic dicarboxylic acid and the remaining dicarboxylic acid being selected from the group consisting of terephthalic acid and isophthalic acid, and having at least one hydrophilic surface and obtained by the process defined in claim 1.

12. A film base as defined in claim 11 having on at least one of said hydrophilic surfaces a layer comprising a water-permeable organic colloid.

13. A film base as defined in claim 11 having on at least one of said hydrophilic surfaces a sublayer of a water-permeable organic colloid and a contiguous layer of a water permeable organic colloid containing dispersed light-sensitive material.

14. A film base as defined in claim 11 having on at least one of said hydrophilic surfaces a sublayer of a water-permeable organic colloid and a contiguous layer of a water-permeable organic colloid containing dispersed light-sensitive silver halide.

15. A film base as defined in claim 11 having on at least one of said hydrophilic surfaces a sublayer of gelatin.

16. A film base as defined in claim 11 having on at least one of said hydrophilic surfaces a light-sensitive gelatino-silver halide emulsion layer.

References Cited in the file of this patent

UNITED STATES PATENTS

| | | |
|---|---|---|
| Re. 24,062 | Horton | Sept. 20, 1955 |
| 2,125,374 | Herrmann et al. | Aug. 2, 1938 |
| 2,668,134 | Horton | Feb. 2, 1954 |
| 2,805,173 | Ambler | Sept. 3, 1957 |
| 2,876,187 | Wolinski | Mar. 3, 1959 |
| 2,943,937 | Nadeau et al. | July 5, 1960 |

FOREIGN PATENTS

| | | |
|---|---|---|
| 683,218 | Great Britain | Nov. 26, 1952 |